(12) United States Patent
Sakai

(10) Patent No.: US 9,186,981 B2
(45) Date of Patent: Nov. 17, 2015

(54) WORK VEHICLE

(71) Applicant: KOMATSU LTD., Tokyo (JP)

(72) Inventor: Yukihisa Sakai, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/366,084

(22) PCT Filed: Nov. 21, 2013

(86) PCT No.: PCT/JP2013/081374
§ 371 (c)(1),
(2) Date: Jun. 17, 2014

(87) PCT Pub. No.: WO2014/184977
PCT Pub. Date: Nov. 20, 2014

(65) Prior Publication Data
US 2015/0151628 A1   Jun. 4, 2015

(51) Int. Cl.
| | | |
|---|---|---|
| *B60K 11/00* | (2006.01) | |
| *B60K 11/06* | (2006.01) | |
| *E02F 3/76* | (2006.01) | |
| *E02F 9/08* | (2006.01) | |
| *B60K 11/04* | (2006.01) | |

(52) U.S. Cl.
CPC ............... *B60K 11/06* (2013.01); *E02F 3/764* (2013.01); *E02F 3/765* (2013.01); *E02F 3/7645* (2013.01); *E02F 3/7654* (2013.01); *E02F 9/0866* (2013.01); *E02F 9/0891* (2013.01); *B60K 11/04* (2013.01); *B60Y 2200/411* (2013.01)

(58) Field of Classification Search
CPC ......... B60K 11/00; B60K 11/04; B60K 11/08

USPC ............. 180/68.1, 68.4, 68.2, 68.6, 291
See application file for complete search history.

(56) References Cited

U.S. PATENT DOCUMENTS

| | | | |
|---|---|---|---|
| 2009/0249657 A1* | 10/2009 | Freeman | 37/231 |
| 2010/0018732 A1 | 1/2010 | Daniel et al. | |
| 2013/0133963 A1* | 5/2013 | Ajisaka | 180/68.1 |

FOREIGN PATENT DOCUMENTS

| | | |
|---|---|---|
| CN | 102105639 A | 6/2011 |
| JP | S56-149022 U | 11/1981 |
| JP | S57-8114 U | 1/1982 |
| JP | H02-84721 U | 7/1990 |
| JP | H02-103819 U | 8/1990 |
| JP | H07-158111 A | 6/1995 |

(Continued)

*Primary Examiner* — J. Allen Shriver, II
*Assistant Examiner* — Bryan Evans
(74) *Attorney, Agent, or Firm* — Drinker Biddle & Reath LLP

(57) ABSTRACT

A work vehicle capable of cooling an engine compartment in a simple structure is provided. A partition wall partitions an internal space of an exterior cover into an engine compartment housing the engine and a cooling compartment housing the air blower. The partition wall includes a first wall portion extending at a relatively large inclination with respect to a direction in which an upper side plate of the exterior cover located on the cooling compartment side with respect to the partition wall extends, and a second wall portion extending at a relatively small inclination. An upper opening portion as an air intake port connecting an external space and the internal space of the exterior cover is provided in the upper side plate so as to be located to face the second wall portion. The first wall portion is provided with an opening connecting the engine compartment and the cooling compartment.

7 Claims, 6 Drawing Sheets

(56) References Cited

FOREIGN PATENT DOCUMENTS

| JP | 2004-169518 A | 6/2004 |
| JP | 2007-283801 A | 11/2007 |
| JP | 2011-178178 A | 9/2011 |

* cited by examiner

WORK VEHICLE

TECHNICAL FIELD

The present invention relates to a work vehicle, and particularly to a work vehicle including an engine.

BACKGROUND ART

Conventionally, a work vehicle such as a motor grader includes an engine, a heat exchanger used for cooling the engine, and an air blower supplying cooling air to the heat exchanger. Japanese Patent Laying-Open No. 2007-283801 (PTD 1) discloses a configuration in which the space within an exterior cover is divided by a partition plate into an engine compartment housing the engine and a heat exchanger compartment housing a cooling fan. In this configuration, the air within the engine compartment is sucked out by a discharge hose provided across the engine compartment and the heat exchanger compartment, and discharged to the outside.

CITATION LIST

Patent Document

PTD 1: Japanese Patent Laying-Open No. 2007-283801

SUMMARY OF INVENTION

Technical Problem

According to the configuration disclosed in the above-mentioned publication, a cooling fan is operated to ventilate the engine compartment, so that the engine compartment can be cooled. In this case, however, it is necessary to provide a discharge hose across the engine compartment and the heat exchanger compartment, which causes a problem that the structure around the partition plate becomes complicated.

The present invention has been made in light of the above-described problem. An object of the present invention is to provide a work vehicle capable of cooling an engine compartment in a simple structure.

Solution to Problem

A work vehicle of the present invention includes a work implement, an engine, an air blower, an exterior cover, and a partition wall. The exterior cover covers the engine and the air blower. The partition wall partitions an internal space of the exterior cover into an engine compartment housing the engine and a cooling compartment housing the air blower. The partition wall includes a first wall portion inclined at a first inclination angle with respect to a direction in which an upper side plate of the exterior cover located on the cooling compartment side with respect to the partition wall extends, and a second wall portion inclined at a second inclination angle with respect to the direction in which the upper side plate extends. The first inclination angle is greater than the second inclination angle. An air intake port connecting an external space and the internal space of the exterior cover is provided in the upper side plate so as to be located to face the second wall portion. The first wall portion is provided with an opening connecting the engine compartment and the cooling compartment.

According to the work vehicle of the present invention, the flow of air generated within the cooling compartment produces a pressure difference between the inside of the engine compartment and the inside of the cooling compartment, thereby causing the air within the engine compartment to flow through the opening into the cooling compartment. Since this allows ventilation of the engine compartment, the engine compartment can be cooled in a simple structure having an opening provided in the first wall portion.

The above-described work vehicle includes a cooling unit disposed within the cooling compartment on the partition wall side with respect to the air blower. The second wall portion is inclined such that a portion closer to a lower end is located closer to the cooling unit. Consequently, air flowing into the engine compartment through the opening is suppressed, so that the cooling ability in the cooling compartment can be improved.

According to the above-described work vehicle, the second wall portion is located on the cooling compartment side with respect to the opening. Consequently, incoming of rainwater or a foreign substance into the engine compartment can be suppressed, so that each device within the engine compartment can be more reliably protected.

According to the above-described work vehicle, the first wall portion and the second wall portion form an angle of 20° or less. In this case, the height of the second wall portion protruding toward the cooling compartment with respect to the first wall portion is reduced. Thereby, the flow velocity of the air flowing along the first wall portion can be increased, and the ability to suck out the air from the engine compartment can be further improved. Therefore, the engine compartment can be cooled further efficiently.

According to the above-described work vehicle, the first wall portion includes an edge portion at which the partition wall is connected to the upper side plate. In this case, the first wall portion can be disposed so as to be closer to the air intake port. Thereby, the flow velocity of the air flowing along the first wall portion can be increased, and the ability to suck out the air from the engine compartment can be further improved. Therefore, the engine compartment can be cooled further efficiently.

The above-described work vehicle includes a cooling unit disposed within the cooling compartment on the partition wall side with respect to the air blower. The first wall portion is inclined such that a portion closer to a lower end is located closer to the cooling unit. In this way, the flow rate of the air flowing into the cooling compartment can be increased. Accordingly, the cooling ability for various devices forming the work vehicle can be further improved. Furthermore, the flow velocity of the air flowing along the first wall portion can be increased, and the ability to suck out the air from the engine compartment can be further improved. Therefore, the cooling efficiency within the engine compartment can be further improved.

The above-described work vehicle further includes an aftertreatment device processing exhaust gas discharged from the engine. The aftertreatment device is disposed within the engine compartment at a position closer to the opening than to the engine. In this way, since the aftertreatment device is disposed near the opening, the aftertreatment device can be air-cooled efficiently by forming an airflow around the aftertreatment device. Therefore, overheating of the aftertreatment device can be more reliably prevented.

According to the above-described work vehicle, by driving the air blower, outside air flows into the cooling compartment through the air intake port, and air higher in temperature than the outside air flows from the engine compartment through the opening into the cooling compartment. Consequently, the high-temperature air within the engine compartment is efficiently discharged to the outside of the engine compartment, so that the engine compartment can be efficiently cooled.

Advantageous Effects of Invention

According to the present invention as described above, the engine compartment can be cooled by ventilating the engine compartment in a simple structure, so that overheating of devices within the engine compartment can be prevented.

DESCRIPTION OF EMBODIMENTS

The embodiments of the present invention will be hereinafter described with reference to the accompanying drawings.

Although the configuration of a motor grader will be first described as an example of a work vehicle to which the idea of the present invention can be applied, the present invention is applicable to various kinds of work vehicles such as a wheel loader and a bulldozer.

First Embodiment

Figure 1:
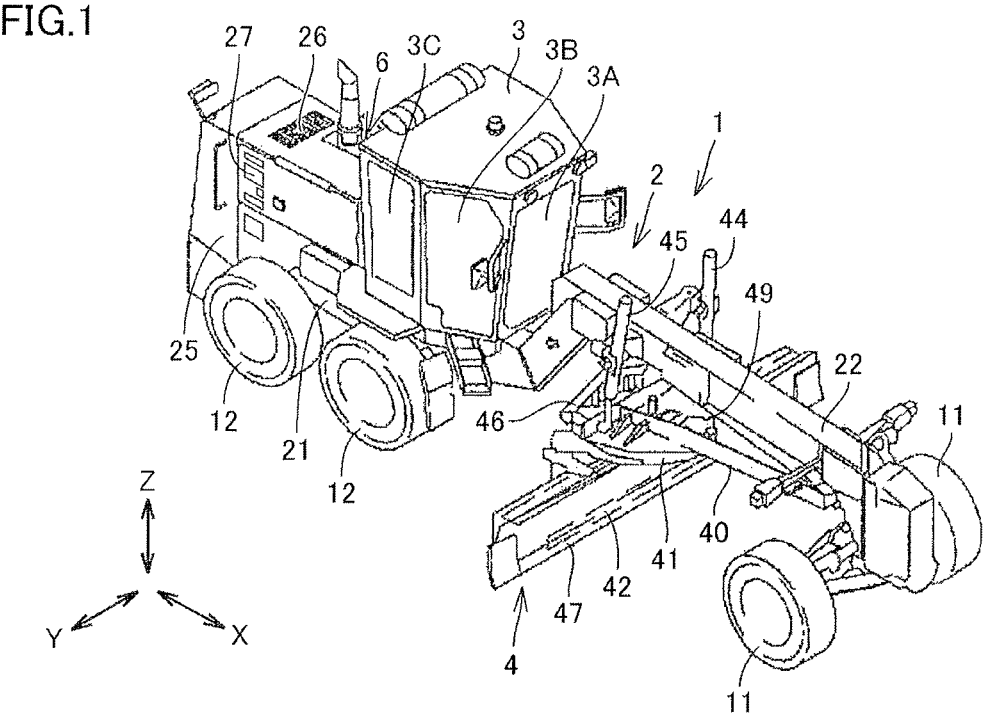
FIG. 1 is a perspective view schematically showing the configuration of a motor grader in one embodiment of the present invention.
Figure 2:
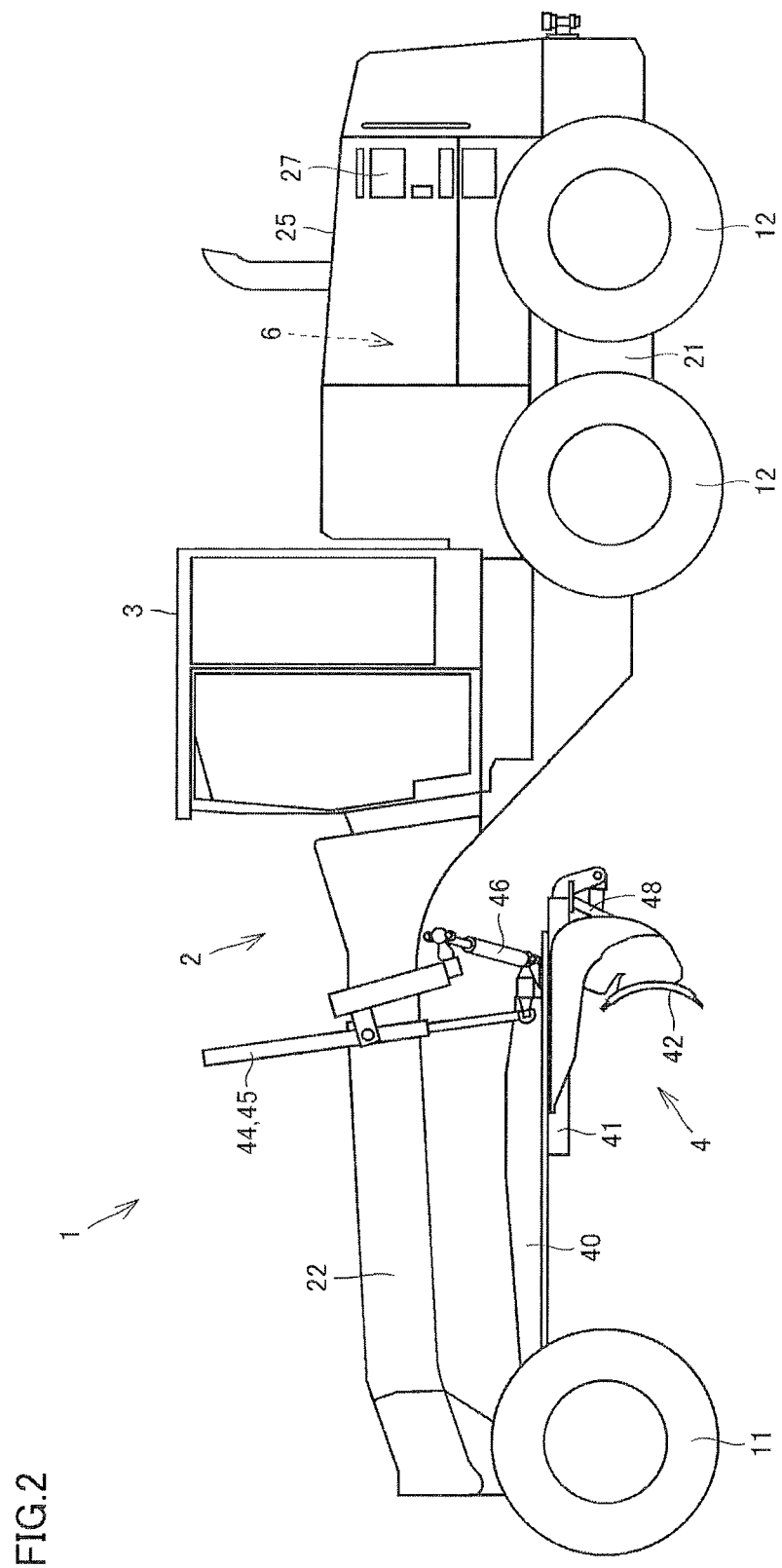
FIG. 2 is a side view schematically showing the configuration of the motor grader.

FIG. 1 is a perspective view schematically showing the configuration of a motor grader 1 in one embodiment of the present invention. FIG. 2 is a side view schematically showing the configuration of motor grader 1. Referring to FIGS. 1 and 2, motor grader 1 in the present embodiment mainly includes driving wheels 11 and 12, a vehicle body frame 2, a cab 3, and a work implement 4. Motor grader 1 also includes components such as an engine disposed in engine compartment 6. Work implement 4 includes a blade 42. Using this blade 42, motor grader 1 can perform operations such as a ground leveling operation, a snow-removal operation, a light cutting operation, and a material mixing operation.

Driving wheels 11 and 12 include a front wheel 11 and a rear wheel 12. Although FIGS. 1 and 2 each show driving wheels including two front wheels 11 for one wheel on each side and four rear wheels 12 for two wheels on each side, the number and arrangement of the front wheels and the rear wheels are not limited thereto.

In the following description of the accompanying drawings, the forward and backward direction means the forward and backward direction of motor grader 1. In other words, the forward and backward direction means the forward and backward direction as seen from the operator who sits in the operator's seat of cab 3. The right and left direction or the lateral direction means the vehicle width direction of motor grader 1. In other words, the right and left direction, the vehicle width direction or the lateral direction means the right and left direction as seen from the operator who sits in the operator's seat of cab 3. In the accompanying drawings, the forward and backward direction is indicated by an arrow X in the figure, the right and left direction is indicated by an arrow Y in the figure, and the upward and downward direction is indicated by an arrow Z in the figure.

Vehicle body frame 2 includes a rear frame 21, a front frame 22 and an exterior cover 25. Rear frame 21 supports exterior cover 25 and components such as an engine disposed in engine compartment 6. Exterior cover 25 covers engine compartment 6. Exterior cover 25 is provided with an upper opening portion 26, a side opening portion 27, and a back opening portion described later. Upper opening portion 26, side opening portion 27 and the back opening portion are formed to penetrate through exterior cover 25 in the thickness direction.

Rear frame 21 is provided with, for example, four rear wheels 12 described above such that each rear wheel 12 can be driven to rotate by the driving force from the engine. Front frame 22 is attached in front of rear frame 21. Front frame 22 has a front end to which, for example, two front wheels 11 described above are attached in a rotatable manner.

Cab 3 is placed on front frame 22. Operation units such as a handle, a gear shift lever, an operating lever for work implement 4, a brake, an accelerator pedal, and an inching pedal (not shown) are provided within cab 3. It is to be noted that cab 3 may be placed on rear frame 21.

Work implement 4 mainly includes a drawbar 40, a circle 41, a blade 42, a hydraulic motor 49, and various kinds of hydraulic cylinders 44 to 48.

Drawbar 40 has a front end that is attached to the front end of front frame 22 in a swingable manner. Drawbar 40 has a rear end that is supported to front frame 22 by a pair of lift cylinders 44 and 45. By synchronous extension or contraction of this pair of lift cylinders 44 and 45, the rear end of drawbar 40 can move up and down with respect to front frame 22. Furthermore, drawbar 40 can swing up and down about the axis extending in the vehicle traveling direction by asynchronous extension or contraction of lift cylinders 44 and 45.

A drawbar shift cylinder 46 is attached to front frame 22 and the side end of drawbar 40. By extension or contraction of this drawbar shift cylinder 46, drawbar 40 can be moved in the right and left direction with respect to front frame 22.

Circle 41 is attached to the rear end of drawbar 40 in a rotatable manner. By hydraulic motor 49, circle 41 can be driven to rotate in the clockwise direction or in the counterclockwise direction with respect to drawbar 40 as seen from above the vehicle.

Blade 42 is supported so as to be slidable in the right and left direction with respect to circle 41 and so as to be swingable up and down about the axis parallel to the right and left direction. Specifically, blade shift cylinder 47 is attached to circle 41 and blade 42, and disposed so as to extend in the longitudinal direction of blade 42. This blade shift cylinder 47 allows blade 42 to be movable in the right and left direction with respect to circle 41.

Furthermore, a tilt cylinder 48 is attached to circle 41 and blade 42. When this tilt cylinder 48 is extended or contracted, blade 42 can swing about the axis parallel to the right and left direction with respect to circle 41 and can change its direction to the upward and downward direction. Thereby, tilt cylinder 48 can change the inclination angle of blade 42 with respect to the moving direction.

As described above, blade 42 is configured such that, by means of drawbar 40 and circle 4, it can move up and down with respect to the vehicle, can change its inclination with respect to the moving direction, can change its inclination with respect to the lateral direction, can rotate, and can shift in the right and left direction.

Figure 3:
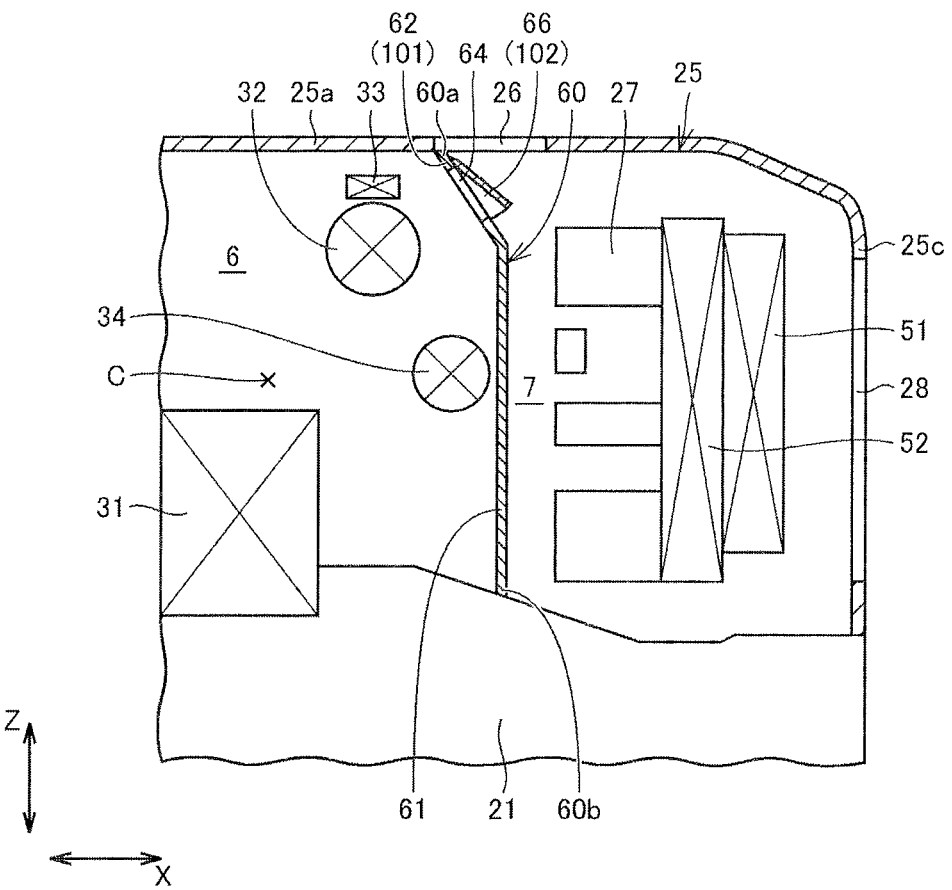
FIG. 3 is a partial cross-sectional view schematically showing the configuration of an engine compartment and a cooling compartment.

Referring to FIGS. 3 to 7, the configuration within the space surrounded by exterior cover 25 used for motor grader 1 of the first embodiment will be hereinafter described. FIG. 3 is a partial cross-sectional view schematically showing the configuration of engine compartment 6 and cooling compartment 7. As shown in FIG. 3, exterior cover 25 is supported by rear frame 21. Exterior cover 25 includes an upper side plate 25a, a back plate 25c and a pair of side plates. Upper side plate 25a, back plate 25c and the side plates each have a plate shape. The space surrounded by upper side plate 25a, back plate 25c and the side plates is formed as a hollow space.

Upper side plate 25a is provided with upper opening portion 26. Upper opening portion 26 is formed to penetrate through upper side plate 25a in the thickness direction, and allows communication between the internal space of exterior cover 25 and the outside thereof. The side plate is provided with side opening portion 27. Side opening portion 27 is formed to penetrate through the side plate in the thickness direction, and allows communication between the internal space of exterior cover 25 and the outside thereof. Back plate 25c is provided with a back opening portion 28. Back opening portion 28 is formed to penetrate through back plate 25c in the thickness direction, and allows communication between the internal space of exterior cover 25 and the outside thereof. Upper opening portion 26, side opening portion 27 and back opening portion 28 connect the external space of exterior cover 25 and the internal space of exterior cover 25.

The internal space of exterior cover 25 is partitioned by partition wall 60 in the forward and backward direction. The space located forward of partition wall 60 is engine compartment 6 while the space located backward of partition wall 60 is cooling compartment 7. Engine compartment 6 and cooling compartment 7 form a machine room mounted in motor grader 1. An engine 31 generating driving force for operating motor grader 1 is housed within engine compartment 6. Engine 31 is placed on rear frame 21. An air blower 51 is housed within cooling compartment 7. Air blower 51 is for example a propeller fan and supported by rear frame 21 through the support structure that is not shown. Partition wall 60 partitions the internal space of exterior cover 25 into engine compartment 6 housing engine 31 and cooling compartment 7 housing air blower 51.

As seen from above motor grader 1, upper side plate 25a of exterior cover 25 covers engine 31 and air blower 51. As seen from the side of motor grader 1, the side plate of exterior cover 25 covers engine 31 and air blower 51. Engine 31 and air blower 51 are covered by exterior cover 25, and also surrounded by exterior cover 25.

Aftertreatment devices 32 and 34 for processing and purifying exhaust gas discharged from engine 31 are provided within engine compartment 6. Engine 31 and aftertreatment device 34 are connected by the first exhaust pipe that is not shown. Aftertreatment devices 32 and 34 are connected by the second exhaust pipe that is not shown. Aftertreatment devices 32 and 34 are provided so as to be connected to the exhaust pipe of engine 31. The exhaust gas discharged from engine 31 flows sequentially through aftertreatment devices 34 and 32, and is discharged to the outside of motor grader 1. Aftertreatment device 34 is a diesel particulate filter apparatus, for example. Aftertreatment device 32 is a NO removal apparatus in the selection catalytic reduction system, for example.

An electronic device 33 is provided near aftertreatment device 32 within engine compartment 6. Electronic device 33 includes sensors for detecting the temperature of the exhaust gas flowing through aftertreatment device 32 as well as the nitrogen oxide concentration and the oxygen concentration in the exhaust gas. Electronic device 33 also includes a control device for injecting a reducing agent such as urea into the upstream of aftertreatment device 32. The nitrogen oxide contained in the exhaust gas is reduced in aftertreatment device 32, thereby chemically changing the nitrogen oxide into harmless nitrogen gas, so that the nitrogen oxide concentration in the exhaust gas can be lowered.

Aftertreatment devices 32 and 34 and electronic device 33 are arranged within engine compartment 6 so as to be located closer to partition wall 60 than to engine 31. FIG. 3 shows a center position C in engine compartment 6. Center position C indicates the position of the center in engine compartment 6 in the forward and backward direction, in the right and left direction, and in the upward and downward direction. Aftertreatment devices 32 and 34 and electronic device 33 are arranged so as to be located closer to partition wall 60 than to center position C of engine compartment 6.

A cooling unit 52 is provided within cooling compartment 7. Cooling unit 52 is disposed forward with respect to air blower 51 within cooling compartment 7. Cooling unit 52 is disposed within cooling compartment 7 so as to be located closer to partition wall 60 with respect to air blower 51. Cooling unit 52 includes a radiator cooling the cooling water flowing though engine 31, an intercooler cooling the air supplied to engine 31, an oil cooler cooling the hydraulic fluid of the transmission, a condenser condensing the air-conditioning coolant, a hydraulic fluid cooler cooling the hydraulic fluid for driving hydraulic cylinders 44 to 48, and the like.

Air blower 51 generates an airflow that flows through cooling compartment 7. When air blower 51 is operated, an airflow flowing through air blower 51 from the front toward the back is generated. At this time, air flows from three directions through upper opening portion 26, side opening portions 27 on the left and right sides into cooling compartment 7. Upper opening portion 26 and side opening portions 27 each serve as an air intake port for introducing air into cooling compartment 7. The air flowing into cooling compartment 7 flows out of cooling compartment 7 through back opening portion 28. Back opening portion 28 serves as an air outlet port for discharging air from cooling compartment 7.

Air flows sequentially through cooling unit 52 and air blower 51 within cooling compartment 7. The cooling water of engine 31 is cooled by heat exchange between the air flowing through cooling unit 52 and the cooling water of engine 31. Air blower 51 generates the flow of air for cooling engine 31.

Partition wall 60 is formed in a plate shape, and disposed so as to extend from upper side plate 25a of exterior cover 25 to rear frame 21 in the upward and downward direction. Partition wall 60 is disposed so as to extend from the side plate on the left side to the side plate on the right side in the right and left direction. Engine compartment 6 and cooling compartment 7 are partitioned by partition wall 60, thereby suppressing leakage of noise produced by engine 31 from back opening portion 28 to the outside. Partition wall 60 further suppresses that the air flowing through cooling compartment 7 by operation of air blower 51 is heated by heat generated by engine 31, thereby keeping the air temperature within cooling compartment 7 at a relatively lower temperature, to improve the heat exchange efficiency between the heat medium and air in cooling unit 52.

Partition wall 60 has a plate-shaped upright wall portion 61 and a plate-shaped inclined wall portion 62. Upright wall portion 61 extends in the upward and downward direction shown by arrow Z in FIG. 3. Inclined wall portion 62 extends in the direction inclined with respect to the upward and downward direction shown by arrow Z in FIG. 3 and to the forward and backward direction shown by arrow X in FIG. 3. Partition wall 60 is entirely formed in a bent shape obtained by joining upright wall portion 61 and inclined wall portion 62 at each edge.

Partition wall 60 has an upper edge portion 60a connected to upper side plate 25a of exterior cover 25 and a lower edge portion 60b connected to rear frame 21. Upright wall portion 61 includes lower edge portion 60b of partition wall 60. Inclined wall portion 62 includes upper edge portion 60a of partition wall 60. Inclined wall portion 62 is inclined with respect to the upward and downward direction and to the forward and backward direction such that a portion closer to its upper end extends more forwardly. Inclined wall portion 62 is inclined such that a portion closer to its lower end is located closer to air blower 51 and cooling unit 52. Upper side plate 25a of exterior cover 25 extends in the forward and backward direction shown by arrow X.

Inclined wall portion 62 is inclined with respect to upper side plate 25a of exterior cover 25 such that a portion closer to upper edge portion 60a connected to upper side plate 25a is located closer to engine compartment 6 from cooling compartment 7.

Inclined wall portion 62 is provided with an opening 64. Opening 64 penetrates through plate-shaped inclined wall portion 62 forming a part of partition wall 60 in the thickness direction. Opening 64 connects engine compartment 6 and cooling compartment 7.

Partition wall 60 further includes an inclined wall portion 66. Inclined wall portion 66 has a portion extending in the direction inclined with respect to the upward and downward direction shown by arrow Z in FIG. 3 and to the forward and backward direction shown by arrow X in FIG. 3. Inclined wall portion 66 protrudes toward cooling compartment 7 with respect to inclined wall portion 62. As compared with inclined wall portion 62, inclined wall portion 66 is disposed so as to be located closer to upper side plate 25a of exterior cover 25. As compared with inclined wall portion 62, inclined wall portion 66 is disposed so as to be located closer to air blower 51. Inclined wall portion 66 is disposed to cover opening 64 provided in inclined wall portion 62 from the cooling compartment 7 side. Inclined wall portion 66 is located on the cooling compartment 7 side with respect to opening 64. Upper opening portion 26 in upper side plate 25a of exterior cover 25 is provided at the position where it faces inclined wall portion 66 as seen in the upward and downward direction.

Figure 4:
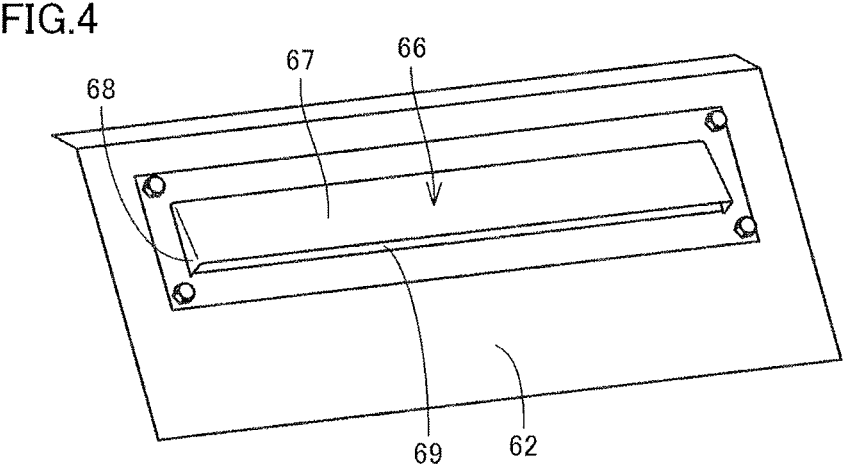
FIG. 4 is a perspective view showing the configuration of an inclined wall portion forming a part of a partition wall.
Figure 5:
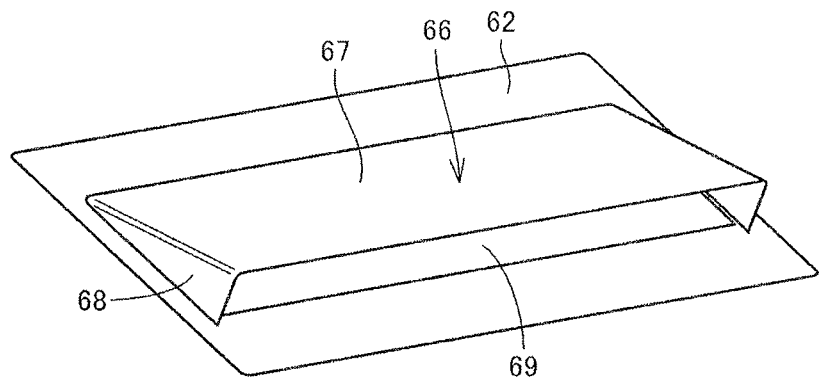
FIG. 5 is a perspective view showing the configuration of a main part of the inclined wall portion.

FIG. 4 is a perspective view showing the configuration of inclined wall portions 62 and 66 forming a part of partition wall 60. FIG. 5 is a perspective view showing the configuration of main parts of inclined wall portions 62 and 66. As to inclined wall portions 62 and 66, inclined wall portion 66 may be connected to inclined wall portion 62 using a bolt as shown in FIG. 4, or these inclined wall portions may be integrally formed by welding or the like.

As shown in FIGS. 4 and 5, inclined wall portion 66 has a plate-shaped flat plate portion 67 and a pair of plate-shaped connecting portions 68. Flat plate portion 67 has a rectangular shape. Connecting portion 68 has a triangular shape. Flat plate portion 67 is formed in a rectangular shape having longer sides, one of which is connected to inclined wall portion 62, and this flat plate portion 67 is inclined with respect to inclined wall portion 62 such that a portion closer to the other longer side is farther away from inclined wall portion 62. Flat plate portion 67 is formed in a rectangular shape having shorter sides that are connected to connecting portion 68. Connecting portion 68 is formed in a triangular shape having a vertex angle that is joined to a connecting portion between flat plate portion 67 and inclined wall portion 62. The bottom side of triangular connecting portion 68 has a length corresponding to the distance between the above-mentioned other longer side of rectangular flat plate portion 67 and inclined wall portion 62.

Flat plate portion 67 is inclined with respect to upper side plate 25a such that a portion closer to upper side plate 25a of exterior cover 25 is located closer to engine compartment 6 from cooling compartment 7. Flat plate portion 67 is inclined such that a portion closer to its lower end is located closer to air blower 51 and cooling unit 52. Among four sides of rectangular flat plate portion 67, the longer side not connected to inclined wall portion 62 is located at a distance from inclined wall portion 62. Between the longer side of flat plate portion 67 not connected to inclined wall portion 62 and inclined wall portion 62, an opening 69 surrounded by flat plate portion 67, a pair of connecting portions 68 and inclined wall portion 62 is provided.

This opening 69 is in communication with opening 64 that penetrates through inclined wall portion 62. Engine compartment 6 and cooling compartment 7 are in communication with each other through openings 64 and 69. Openings 64 and 69 contribute to the communication between engine compartment 6 and cooling compartment 7. Inclined wall portion 66 has an upper end connected to inclined wall portion 62. Opening 69 is provided at the lower end of inclined wall portion 66. Opening 69 is opened in the downward direction of cooling compartment 7. Opening 69 is opened in the direction toward air blower 51 with respect to inclined wall portion 66 in the upward and downward direction.

Figure 6:
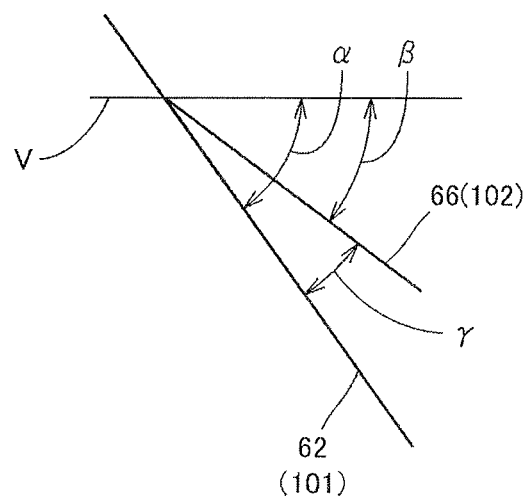
FIG. 6 is a schematic diagram showing an inclination angle between a first wall portion and a second wall portion.

FIG. 6 is a schematic diagram showing an inclination angle between a first wall portion 101 and a second wall portion 102. A straight line V extending in the right and left direction in FIG. 6 virtually shows the direction in which upper side plate 25a of exterior cover 25 extends. FIG. 6 shows inclined wall portions 62 and 66 in a simplified manner as seen from the lateral side.

An angle $\alpha$ in FIG. 6 shows an angle formed between straight line V and inclined wall portion 62. Angle $\alpha$ shows the inclination angle of inclined wall portion 62 to the direction in which upper side plate 25a located on the cooling compartment 7 side with respect to partition wall 60 extends. An angle $\beta$ shows an angle formed between straight line V and inclined wall portion 66 (that is, flat plate portion 67 shown in FIGS. 4 and 5). Angle $\beta$ shows the inclination angle of inclined wall portion 66 to the direction in which upper side plate 25a located on the cooling compartment 7 side with respect to partition wall 60 extends. An angle $\gamma$ shows an angle formed between inclined wall portion 62 and inclined wall portion 66 (flat plate portion 67). The position on the cooling compartment 7 side with respect to partition wall 60 used herein means the position on the cooling compartment 7 side with respect to upper edge portion 60a at which partition wall 60 is connected to upper side plate 25a of exterior cover 25.

Angle α is larger than angle β. As compared with inclined wall portion 66, inclined wall portion 62 is inclined more with respect to the direction in which upper side plate 25a of exterior cover 25 extends. Inclined wall portion 62 and inclined wall portion 66 are arranged such that angle γ is equal to or less than 20°. Inclined wall portions 62 and 66 may be positioned such that angle γ is 17°, for example.

Inclined wall portion 62 forms first wall portion 101 extending at a relatively large inclination with respect to the direction in which upper side plate 25a of exterior cover 25 located on the cooling compartment 7 side with respect to partition wall 60 extends, in the first embodiment. Inclined wall portion 66 forms second wall portion 102 extending at a relatively small inclination with respect to the direction in which upper side plate 25a of exterior cover 25 located on the cooling compartment 7 side with respect to partition wall 60 extends, in the first embodiment. As to angle α and angle β, the relatively large first inclination angle is angle α while the relatively small second inclination angle is angle β.

Figure 7:
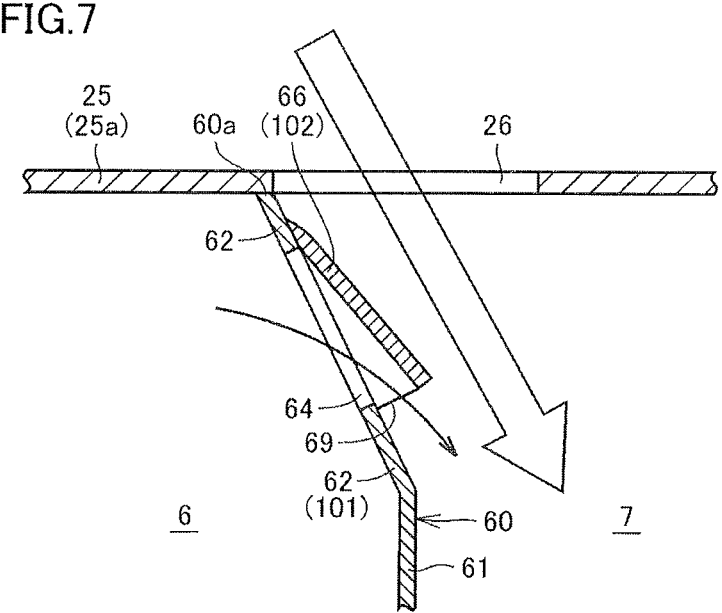
FIG. 7 is a schematic diagram showing an airflow within an exterior cover.

FIG. 7 is a schematic diagram showing an airflow within exterior cover 25. As described above, air blower 51 shown in FIG. 3 is driven, thereby causing outside air to flow from the external space of exterior cover 25 through upper opening portion 26 as an air intake port into cooling compartment 7 as a part of the internal space of exterior cover 25. In FIG. 7, the flow of the outside air flowing into cooling compartment 7 is indicated by an outline arrow. The air flowing into cooling compartment 7 flows along inclined wall portion 62. The flow of air flowing along inclined wall portion 62 as first wall portion 101 is generated by operating air blower 51.

Due to the airflow indicated by the outline arrow in FIG. 7, the pressure on the cooling compartment 7 side is lowered with respect to inclined wall portion 62 in accordance with Bernoulli's theorem. Due to occurrence of a pressure difference between the inside of engine compartment 6 and the inside of, cooling compartment 7, the air within engine compartment 6 flows into opening 64 of inclined wall portion 62, and further flows through opening 69 between inclined wall portion 62 and inclined wall portion 66 into cooling compartment 7. The arrow in FIG. 7 indicates the flow of the air flowing from engine compartment 6 sequentially through openings 64 and 69 into cooling compartment 7.

The outside air flowing through upper opening portion 26 into cooling compartment 7 is at an atmosphere temperature. On the other hand, engine 31, aftertreatment devices 32 and 34, and electronic device 33 disposed within engine compartment 6 each are an exothermic device generating heat. By these exothermic devices, the air within engine compartment 6 is heated and increased in temperature. Accordingly, the temperature of the air flowing from engine compartment 6 through openings 64 and 69 into cooling compartment 7 is relatively higher than that of the outside air at an atmosphere temperature. In other words, by driving air blower 51, the air higher in temperature than the outside air flowing through upper opening portion 26 into cooling compartment 7 is caused to flow from engine compartment 6 through openings 64 and 69 into cooling compartment 7.

It is desirable that opening 64 of inclined wall portion 62 is formed relatively smaller than upper opening portion 26 provided in upper side plate 25a of exterior cover 25. For example, opening 64 and upper opening portion 26 may be formed such that the ratio between the opening area of opening 64 and the opening area of upper opening portion 26 is set at 1:4. Furthermore, it is desirable that opening 69 between inclined wall portion 62 and inclined wall portion 66 is formed relatively smaller than opening 64 formed in inclined wall portion 62. For example, openings 64 and 69 may be formed such that the ratio between the opening area of opening 69 and the opening area of opening 64 is set at 1:4. Openings 64 and 69 may be formed in such a shape as extending in the right and left direction. For example, opening 69 may have a slit shape extending in the right and left direction.

Second Embodiment

Figure 8:
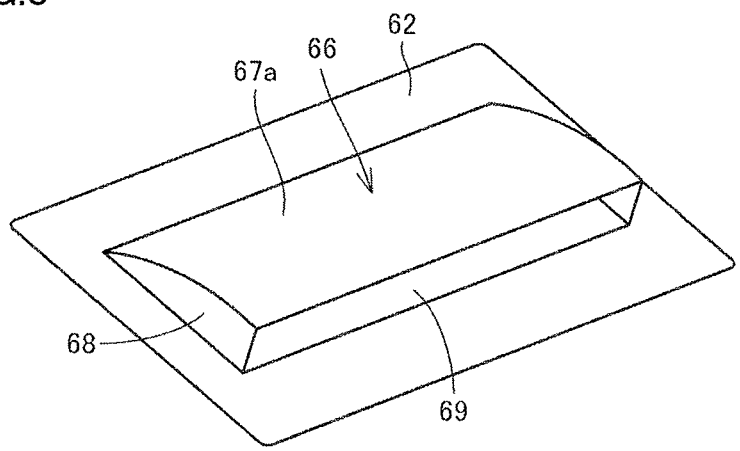
FIG. 8 is a perspective view showing the configuration of a main part of an inclined wall portion according to the second embodiment.

FIG. 8 is a perspective view showing the configuration of main parts of inclined wall portions 62 and 66 according to the second embodiment. Although inclined wall portion 66 is configured to have flat plate portion 67 in a rectangular shape in the first embodiment shown in FIG. 5, it is not limited to this example. As shown in FIG. 8, inclined wall portion 66 may have a curved plate portion 67a having a rectangular plate formed in a curved shape, in place of flat plate portion 67. Even in this configuration, the edge of curved plate portion 67a on the side opposite to the edge connected to inclined wall portion 62 is disposed at a distance from inclined wall portion 62, thereby forming opening 69. Engine compartment 6 and cooling compartment 7 are in communication with each other through openings 64 and 69, thereby implementing a configuration allowing formation of the flow of air flowing from engine compartment 6 through openings 64 and 69 into cooling compartment 7.

Third Embodiment

Figure 9:
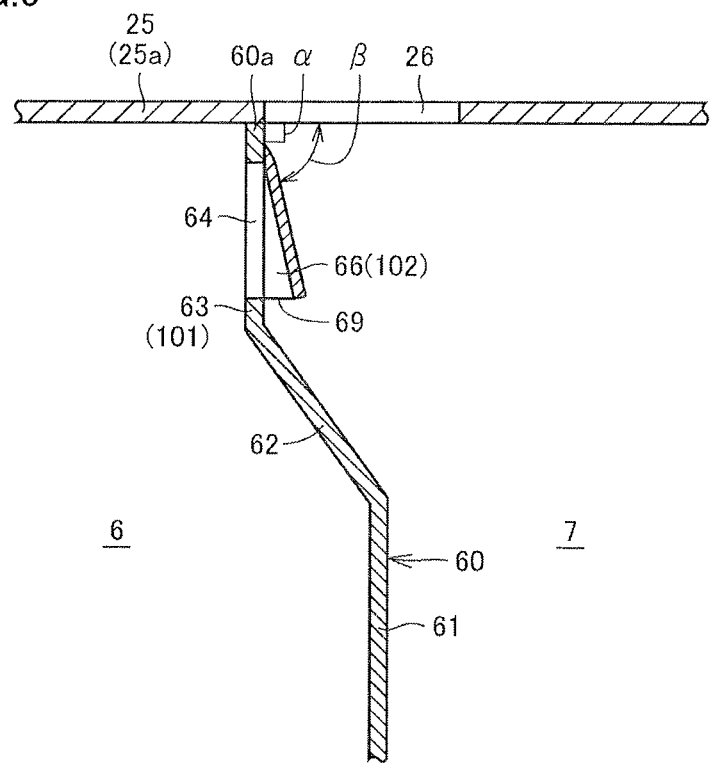
FIG. 9 is a cross-sectional view schematically showing the configuration of a partition wall according to the third embodiment.

FIG. 9 is a cross-sectional view schematically showing the configuration of partition wall 60 according to the third embodiment. FIG. 9 schematically shows only a part of upper side plate 25a of exterior cover 25 and a part of partition wall 60 near upper side plate 25a.

Partition wall 60 according to the third embodiment shown in FIG. 9 includes plate-shaped upright wall portion 61, plate-shaped inclined wall portion 62 and plate-shaped upright wall portion 63. Upright wall portions 61 and 63 extend in the upward and downward direction. Inclined wall portion 62 extends in the direction inclined with respect to the upward and downward direction and to the forward and backward direction. Partition wall 60 is entirely configured to have a shape bent twice, in which upright wall portion 61 and inclined wall portion 62 are joined at each edge, and inclined wall portion 62 and upright wall portion 63 are further joined at each edge.

Upright wall portion 63 includes upper edge portion 60a of partition wall 60. Upright wall portion 63 is provided with opening 64. Opening 64 penetrates through plate-shaped upright wall portion 63 forming a part of partition wall 60 in the thickness direction. Opening 64 connects engine compartment 6 and cooling compartment 7. Inclined wall portion 66 has a portion extending in the direction inclined with respect to the upward and downward direction and to the forward and backward direction. Inclined wall portion 66 is located on the cooling compartment 7 side with respect to opening 64 formed in upright wall portion 63, and disposed so as to cover opening 64 from the cooling compartment 7 side. Upper opening portion 26 in upper side plate 25a of exterior cover 25 is located to face inclined wall portion 66 as seen in the upward and downward direction.

Angle α in FIG. 9 shows the angle between upright wall portion 63 and the direction in which upper side plate 25a of exterior cover 25 on the cooling compartment 7 side with respect to partition wall 60 extends. Angle β in FIG. 9 shows the angle between inclined wall portion 66 (flat plate portion 67 shown in FIGS. 4 and 5) and the direction in which upper side plate 25a of exterior cover 25 on the cooling compartment 7 side with respect to partition wall 60 extends. Angle α is a right angle and angle β is an acute angle. Angle α is greater than angle β. As compared with inclined wall portion 66, upright wall portion 63 is more inclined with respect to the direction in which upper side plate 25a located on the cooling compartment 7 side with respect to partition wall 60 extends.

Upright wall portion 63 forms first wall portion 101 extending at a relatively large inclination with respect to the direction in which upper side plate 25a of exterior cover 25 located on the cooling compartment 7 side with respect to partition wall 60 extends, in the third embodiment. Inclined wall portion 66 forms second wall portion 102 extending at a relatively small inclination with respect to the direction in which upper side plate 25a of exterior cover 25 located on the cooling compartment 7 side with respect to partition wall 60 extends, in the third embodiment. Upright wall portion 63 as first wall portion 101 is provided with opening 64 penetrating through partition wall 60 in the thickness direction. As to angles α and β, the relatively large first inclination angle is angle α while the relatively small second inclination angle is angle β.

Fourth Embodiment

Figure 10:
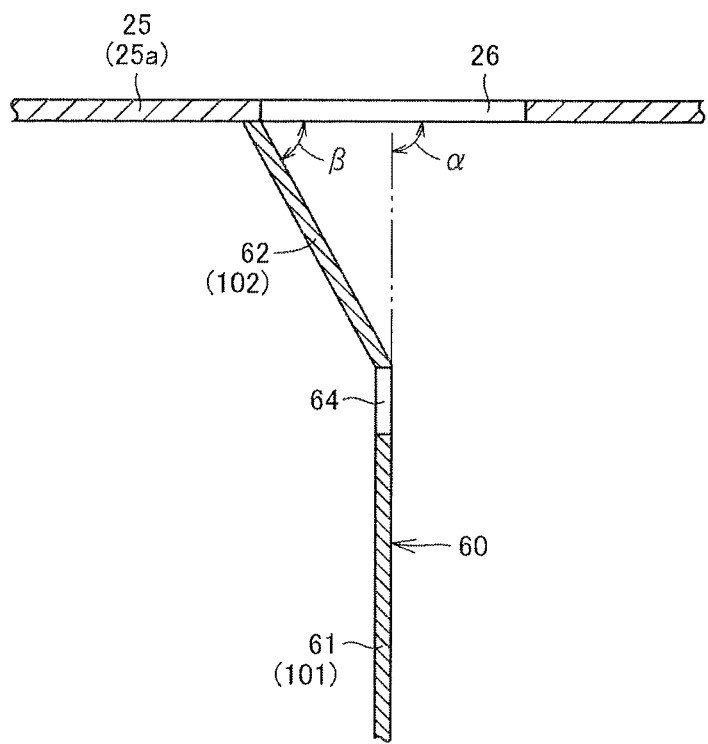
FIG. 10 is a cross-sectional view schematically showing the configuration of a partition wall according to the fourth embodiment.

FIG. 10 is a cross-sectional view schematically showing the configuration of partition wall 60 according to the fourth embodiment. FIG. 10 schematically shows only a part of upper side plate 25a of exterior cover 25 and a part of partition wall 60 near upper side plate 25a.

Partition wall 60 according to the fourth embodiment shown in FIG. 10 has plate-shaped upright wall portion 61 and plate-shaped inclined wall portion 62. Upright wall portion 61 extends in the upward and downward direction. Inclined wall portion 62 extends in the direction inclined with respect to the upward and downward direction and to the forward and backward direction. Partition wall 60 is entirely formed in a bent shape obtained by joining upright wall portion 61 and inclined wall portion 62 at each edge.

Inclined wall portion 62 includes upper edge portion 60a of partition wall 60. Upright wall portion 61 is provided with opening 64. Opening 64 penetrates through plate-shaped upright wall portion 61 forming a part of partition wall 60 in the thickness direction. Opening 64 connects engine compartment 6 and cooling compartment 7. Opening 64 is formed so as to penetrate through upright wall portion 61 near the edge at which upright wall portion 61 is joined to inclined wall portion 62. Upper opening portion 26 in upper side plate 25a of exterior cover 25 is located to face inclined wall portion 62 as seen in the upward and downward direction.

Angle α in FIG. 10 shows the angle between upright wall portion 61 and the direction in which upper side plate 25a of exterior cover 25 on the cooling compartment 7 side with respect to partition wall 60 extends. Angle β in FIG. 9 shows the angle between inclined wall portion 62 and the direction in which upper side plate 25a of exterior cover 25 on the cooling compartment 7 side with respect to partition wall 60 extends. Angle α is a right angle while angle β is an acute angle. Angle α is greater than angle β. As compared with inclined wall portion 66, upright wall portion 61 is more inclined with respect to the direction in which upper side plate 25a located on the cooling compartment 7 side with respect to partition wall 60 extends.

Upright wall portion 61 forms first wall portion 101 extending at a relatively large inclination with respect to the direction in which upper side plate 25a of exterior cover 25 located on the cooling compartment 7 side with respect to partition wall 60 extends, in the fourth embodiment. Inclined wall portion 62 forms second wall portion 102 extending at a relatively small inclination with respect to the direction in which upper side plate 25a of exterior cover 25 located on the cooling compartment 7 side with respect to partition wall 60 extends, in the fourth embodiment. Upright wall portion 61 as first wall portion 101 is provided with opening 64 penetrating through partition wall 60 in the thickness direction. As to angles α and β, the relatively large first inclination angle is angle α while the relatively small second inclination angle is angle β.

The following is a collective description about the configuration and the functions and effects of the work vehicle including engine compartment 6 and cooling compartment 7 in the above-described embodiments.

According to the above-described embodiments, as shown in FIGS. 7, 9 and 10, partition wall 60 dividing a space into engine compartment 6 and cooling compartment 7 has a first wall portion 101 inclined at angle α with respect to the direction in which upper side plate 25a of exterior cover 25 located on the cooling compartment 7 side with respect to partition wall 60 extends; and a second wall portion 102 inclined at angle β. Referring also to FIG. 6, when comparing angle α showing the inclination of first wall portion 101 and angle β showing the inclination of second wall portion 102, angle α is larger. Upper side plate 25a of exterior cover 25 is provided with upper opening portion 26 connecting the external space and the internal space of exterior cover 25. Upper opening portion 26 is provided such that it is located so as to face second wall portion 102, and also located on the cooling compartment 7 side with respect to upper edge portion 60a at which partition wall 60 is connected to upper side plate 25a. First wall portion 101 is provided with opening 64 connecting engine compartment 6 and cooling compartment 7.

The air flowing from upper opening portion 26 into cooling compartment 7 flows along first wall portion 101. This flow of air causes a pressure difference between the inside of engine compartment 6 and the inside of cooling compartment 7, thereby relatively lowering the pressure within cooling compartment 7. Accordingly, the air within engine compartment 6 flows into cooling compartment 7 through opening 64. Since engine compartment 6 is ventilated in this way, engine compartment 6 can be cooled in a simple structure in which first wall portion 101 is provided with opening 64.

Also as shown in FIG. 3, cooling unit 52 located on the partition wall 60 side with respect to air blower 51 is provided within cooling compartment 7. Second wall portion 102 is inclined with respect to upper side plate 25a such that a portion closer to upper side plate 25a is located closer to engine compartment 6 from cooling compartment 7. As a result, second wall portion 102 is inclined such that a portion closer to its lower end is located closer to cooling unit 52, as shown in FIGS. 7, 9 and 10. Since the air flowing from upper opening portion 26 into cooling compartment 7 is directed by second wall portion 102, the inflow of air through opening 64 into engine compartment 6 is suppressed. In the case where air is introduced from upper side plate 25a to cooling compartment 7, opening 69 provided between first wall portion 101 and second wall portion 102 is directed downward, thereby allowing further suppression of the flow of air flowing through opening 69 toward engine compartment 6. Consequently, since a large amount of outside air can be supplied to cooling unit 52 shown in FIG. 3, the heat exchange efficiency in cooling unit 52 is improved, with the result that the cooling ability for various devices forming motor grader 1 can be improved.

Also as shown in FIGS. 7 and 9, inclined wall portion 66 forming second wall portion 102 is located on the cooling compartment 7 side with respect to opening 64. Since second wall portion 102 inclined with respect to upper side plate 25a is located on the cooling compartment 7 side with respect to opening 64, exposure of opening 64 to upper opening portion 26 formed in upper side plate 25a is suppressed. Consequently, even when rainwater or a foreign substance flows into cooling compartment 7 through upper opening portion 26, incoming of rainwater or a foreign substance into engine compartment 6 can be suppressed. Therefore, each device within engine compartment 6 can be more reliably protected.

Furthermore, the angle formed between first wall portion 101 and second wall portion 102, that is, angle γ shown in FIG. 6, is 20° or less. By defining the angle in this way, it becomes possible to lower the height of second wall portion 102 protruding toward cooling compartment 7 with respect to first wall portion 101. Accordingly, the flow velocity of the air flowing along first wall portion 101 can be further increased, thereby allowing further improvement in the ability to suck out the air from engine compartment 6, so that engine compartment 6 can be cooled further efficiently.

Also as shown in FIGS. 7 and 9, first wall portion 101 includes upper edge portion 60a at which partition wall 60 is connected to upper side plate 25a of exterior cover 25. In this way, first wall portion 101 can be located closer to upper opening portion 26 provided in upper side plate 25a. Accordingly, the flow velocity of the air flowing along first wall portion 101 can be further increased, thereby allowing further improvement in the ability to suck out air from engine compartment 6, so that engine compartment 6 can be cooled further efficiently.

Also as shown in FIG. 7, first wall portion 101 is inclined with respect to upper side plate 25a such that a portion closer to upper edge portion 60a at which partition wall 60 is connected to upper side plate 25a is located closer to engine compartment 6 from cooling compartment 7. Consequently, first wall portion 101 is inclined such that a portion closer to its lower end is located closer to cooling unit 52. In this way, upper opening portion 26 provided in upper side plate 25a can be enlarged in the forward direction in accordance with the inclination of first wall portion 101, thereby allowing an increase in the opening area of upper opening portion 26. Furthermore, upper opening portion 26 is provided at a further distance from air blower 51, thereby allowing an increase in the distance between upper opening portion 26 and cooling unit 52 in the forward and backward direction. Consequently, since the flow rate of the air flowing from upper opening portion 26 into cooling compartment 7 can be increased, the heat exchange efficiency in cooling unit 52 can be further improved. Therefore, the cooling ability for various devices forming motor grader 1 can be further improved.

Furthermore, by providing first wall portion 101 in an inclined state, the direction in which first wall portion 101 extends can be more closely in line with the direction of the flow of air produced by air blower 51. In other words, the angle of the direction of the flow of air flowing along first wall portion 101 to the direction of the flow of air produced by air blower 51 is decreased. Furthermore, first wall portion 101 is to be disposed on the outside of the streamline curve of the airflow flowing from upper opening portion 26 into cooling compartment 7. Accordingly, the flow velocity of the air flowing along first wall portion 101 can be further increased, thereby allowing further improvement in the ability to suck out air from engine compartment 6, so that the cooling efficiency within engine compartment 6 can be further improved.

Also as shown in FIG. 3, motor grader 1 further includes aftertreatment device 32 processing exhaust gas discharged from engine 31. Aftertreatment device 32 is disposed within engine compartment 6 at the position closer to opening 64 than to engine 31. In this way, since aftertreatment device 32 generating heat and increased in temperature is disposed near opening 64, aftertreatment device 32 can be efficiently air-cooled by forming airflow around aftertreatment device 32. Therefore, overheating of aftertreatment device 32 and electronic device 33 disposed near aftertreatment device 32 can be more reliably prevented.

Also as shown in FIGS. 3 and 7, by driving air blower 51, the outside air flows into cooling compartment 7 through upper opening portion 26, and air higher in temperature than the outside air flows from engine compartment 6 through opening 64 of partition wall 60 into cooling compartment 7. Consequently, engine compartment 6 is ventilated and high-temperature air is efficiently discharged to the outside of engine compartment 6, so that engine compartment 6 can be efficiently cooled. Furthermore, since the high-temperature air sucked out of engine compartment 6 is cooled by the flow of a large amount of air at an atmosphere temperature incoming from upper opening portion 26, the temperature rise within cooling compartment 7 is also suppressed. Therefore, since a large amount of air at a relatively lower temperature can be supplied to cooling unit 52, the cooling ability for various devices forming motor grader 1 can be improved.

In the above-described embodiments, upper side plate 25a of exterior cover 25 is disposed to extend in the forward and backward direction shown by arrow X in the figure, but may be disposed to be inclined with respect to the forward and backward direction. Even if upper side plate 25a is disposed to be inclined, partition wall 60 is provided that has first wall portion 101 and second wall portion 102 relatively differently inclined with respect to the direction in which upper side plate 25a extends, and first wall portion 101 is provided with opening 64 penetrating through partition wall 60 in the thickness direction, with the result that the effect of cooling engine compartment 6 by producing an airflow flowing through opening 64 can be similarly achieved.

Furthermore, although second wall portion 102 is located so as to face upper opening portion 26 provided in upper side plate 25a of exterior cover 25, it is not limited to this configuration. Second wall portion 102 can be disposed in an arrangement different from those in the above-described embodiments as long as it is disposed to face the opening of exterior cover 25 having a function as an air intake port through which air is introduced into cooling compartment 7. For example, second wall portion 102 may be disposed so as to face side opening portion 27 provided in the side plate of exterior cover 25. Furthermore, for example, in the case where the floor plate of cooling compartment 7 is provided with an air intake port, second wall portion 102 may be disposed so as to face the air intake port.

In other words, partition wall 60 may have first wall portion 101 extending at a relatively large inclination with respect to the direction in which a plate portion of exterior cover 25 located on the cooling compartment 6 side with respect to partition wall 60 extends, and a second wall portion 102 extending at a relatively small inclination. In this case, it is desirable that opening 69 provided between first wall portion 101 and second wall portion 102 is configured to be opened in the direction away from the air intake port formed in exterior cover 25. For example, when second wall portion 102 is provided to face side opening portion 27 provided in the side plate on the right side of exterior cover 25, it is desirable that opening 69 is configured to be opened toward the left side.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 motor grader, 2 vehicle body frame, 3 cab, 4 work implement, 6 engine compartment, 7 cooling compartment, 11 front wheel, 12 rear wheel, 21 rear frame, 22 front frame, 25 exterior cover, 25a upper side plate, 25c back plate, 26 upper opening portion, 27 side opening portion, 28 back opening portion, 31 engine, 32, 34 aftertreatment device, 33 electronic device, 51 air blower, 52 cooling unit, 60 partition wall, 60a upper edge portion, 60b lower edge portion, 61, 63 upright wall portion, 62, 66 inclined wall portion, 64, 69 opening, 67 flat plate portion, 67a plate portion, 68 connecting portion, 101 first wall portion, 102 second wall portion, C center position.

The invention claimed is:

1. A work vehicle comprising:
a work implement;
an engine;
an air blower;
an exterior cover covering said engine and said air blower;
a partition wall partitioning an internal space of said exterior cover into an engine compartment housing said engine and a cooling compartment housing said air blower; and
a cooling unit disposed within said cooling compartment on the partition wall side with respect to said air blower,
said partition wall including a first wall portion inclined at a first inclination angle with respect to a direction in which an upper side plate of said exterior cover located on the cooling compartment side with respect to said partition wall extends, and a second wall portion inclined at a second inclination angle with respect to the direction in which said upper side plate extends, said first inclination angle being greater than said second inclination angle,
an air intake port connecting an external space and said internal space of said exterior cover being provided in said upper side plate so as to be located to face said second wall portion, and
said first wall portion inclined such that a portion closer to a lower end is located closer to said cooling unit, said first wall portion being provided with an opening connecting said engine compartment and said cooling compartment.

2. The work vehicle according to claim 1, wherein
said second wall portion is inclined such that a portion closer to a lower end is located closer to said cooling unit.

3. The work vehicle according to claim 1, wherein said second wall portion is located on the cooling compartment side with respect to said opening.

4. The work vehicle according to claim 1, wherein said first wall portion and said second wall portion form an angle of 20° or less.

5. The work vehicle according to claim 1, wherein said first wall portion includes an edge portion at which said partition wall is connected to said upper side plate.

6. The work vehicle according to claim 1, further comprising an aftertreatment device processing exhaust gas discharged from said engine, wherein
said after treatment device is disposed within said engine compartment at a position closer to said opening than to said engine.

7. The work vehicle according to claim 1, wherein, by driving said air blower, outside air flows into said cooling compartment through said air intake port, and air higher in temperature than said outside air flows from said engine compartment through said opening into said cooling compartment.

* * * * *